United States Patent [19]
Oh

[11] Patent Number: 5,357,449
[45] Date of Patent: Oct. 18, 1994

[54] COMBINING ESTIMATES USING FUZZY SETS
[75] Inventor: Sang G. Oh, Richardson, Tex.
[73] Assignee: Texas Instruments Incorporated, Dallas, Tex.
[21] Appl. No.: 997,624
[22] Filed: Dec. 23, 1992

Related U.S. Application Data

[63] Continuation of Ser. No. 692,093, Apr. 26, 1991, abandoned.
[51] Int. Cl.$^5$ .............................................. G06F 15/00
[52] U.S. Cl. .................................. 364/551.01; 395/900
[58] Field of Search .................... 364/550, 551.01, 554, 364/484; 395/900

[56] References Cited

U.S. PATENT DOCUMENTS

| 4,837,725 | 6/1989 | Yamakawa | 395/900 |
| 4,839,823 | 6/1989 | Matsumoto | 364/554 |
| 5,051,932 | 9/1991 | Inoue et al. | 364/550 |

OTHER PUBLICATIONS

Bezdek, "Partitions and Relations" from *Pattern Recognition with Fuzzy Objective Function Algorithm*, Plenum Press 1981, ISBN 0-306-40671-3, pp. 15-21.
Gath and Geva, "Unsupervised Optimal Fuzzy Clustering", from *IEEE Transactions on Pattern Analysis and Machine Intelligence*, vol. 11, No. 7, Jul., 1989, pp. 773-781.
Kashyap, Oh and Madan, "Robust Estimation of Sinusoidal Signals with Colored Noise Using Decentralized Processing", from *IEEE Transactions on Acoustics, Speech & Signal Processing*, vol. 38, No. 1, Jan., 1990.
Tom Williams; Fuzzy Logic Simplifier Complex Control Problems; Computer Design; Mar. 1, 1991; pp. 90-102.

*Primary Examiner*—Thomas G. Black
*Assistant Examiner*—Michael Zanelli
*Attorney, Agent, or Firm*—W. Daniel Swayze, Jr.; Leo N. Heiting; Richard L. Donaldson

[57] ABSTRACT

A system for obtaining a estimate of a physical parameter. The system is a multiple point system, in that estimates are obtained from a number of distributed sensors at a single observation time, or alternatively, from a single sensor at a number of observation times. Each sensor point is associated with a processor that calculates an estimate pair, consisting of an estimate of the parameter and a variance. Each estimate pair is used to construct a membership function. The membership functions are combined, and the combined function is optimized to determine a final estimate.

11 Claims, 1 Drawing Sheet

COMBINING ESTIMATES USING FUZZY SETS

This application is a continuation of Ser. No. 07/692,093, filed Apr. 26, 1991, now abandoned.

TECHNICAL FIELD OF THE INVENTION

This invention relates to electronic measuring and analysis systems, and more particularly to a system for estimating a value from data obtained at multiple sensing points.

BACKGROUND OF THE INVENTION

Many of the phenomena that occur in nature are best characterized by random fluctuations. For example, meteorological phenomena such as fluctuations in air temperature and pressure, are characterized as random processes. The various types of sensors used to detect these processes generate random signals. As another example, thermal noise voltages generated in electronic devices generate random signals. A third example is a sonar or a radar signal, whose angle of arrival may occur at random with respect to a detection unit.

Because of the random fluctuations in such processes, the measurement and analysis techniques used for determinate signals are not suitable. Instead statistical methods are used, which are derived from a branch of statistics known as estimation theory. Essentially, it is assumed that a plausible estimate can be made from a finite number of observations.

A specific application of signal estimation is the use of distributed sensors, each associated with a processor, such that each sensor determines its own estimate of the parameter being measured. These estimates are communicated to a central unit, which determines a combined, or "fusion" estimate.

Another example of signal estimation uses a single sensor, but multiple estimates are made over a period of time. The observed process is represented as a stationary signal, such as from the ambient noise in a room. The estimates are combined to obtain a combined estimate.

Distributed sensor and single sensor estimation systems are both "multi-point" systems in the sense that a number of estimates are taken for subsequent combination. For these multi-point systems, a number of methods for combining estimates have been proposed. A simple method is the use of averages. Another relatively simple method uses a least squares approach. More innovative methods include "robust methods". Each of these methods is essentially "linear" in the sense that the combined estimate is a summation of estimates multiplied by a weighting coefficient.

When random signals having more than one frequency are being detected, the methods used to measure the total signal are referred to as spectral estimation methods. Similarly, sonar or radar signals may have more than one angle of arrival. These multi-component signal estimations can be accomplished with equipment and techniques similar to that used for single component estimates, except that additional processing is required to collect and correlate, from all sensors, those estimates that are associated with each frequency or angle of arrival, before combining them. This processing involves various ranking and refitting algorithms.

Existing methods of combining estimates from multi-point systems, whether for single component or for multi-component signals, have not successfully overcome the problem of sensitivity to "bad" estimates, known as "outliers". For example, an estimate from a malfunctioning sensor that has a significant error may have a substantial adverse affect on accuracy of the combined estimate.

A need exists for a measurement system that will combine estimates with reduced sensitivity to bad estimates.

SUMMARY OF THE INVENTION

One aspect of the invention is as a distributed sensor system for estimating the value of a physical parameter. A number of sensors observe and detect a physical quantity, which is represented as a parameter. A sensor processor associated with each sensor is programmed to calculate an estimate and a variance for each parameter. This data is communicated to a central unit, which is programmed to construct a membership function for each estimate. The central unit then combines the membership functions to determine a final estimate. In the combination process, the combined membership function is optimized and its maximum point determined.

A technical advantage of the invention is that estimates obtained by a multi-point sensor system can be combined in a manner that is not sensitive to malfunctioning sensors. The use of fuzzy set theory to represent and combine estimates results in a diminishment of the effect of bad estimates.

DETAILED DESCRIPTION OF THE INVENTION

System Overview

Figure 1:
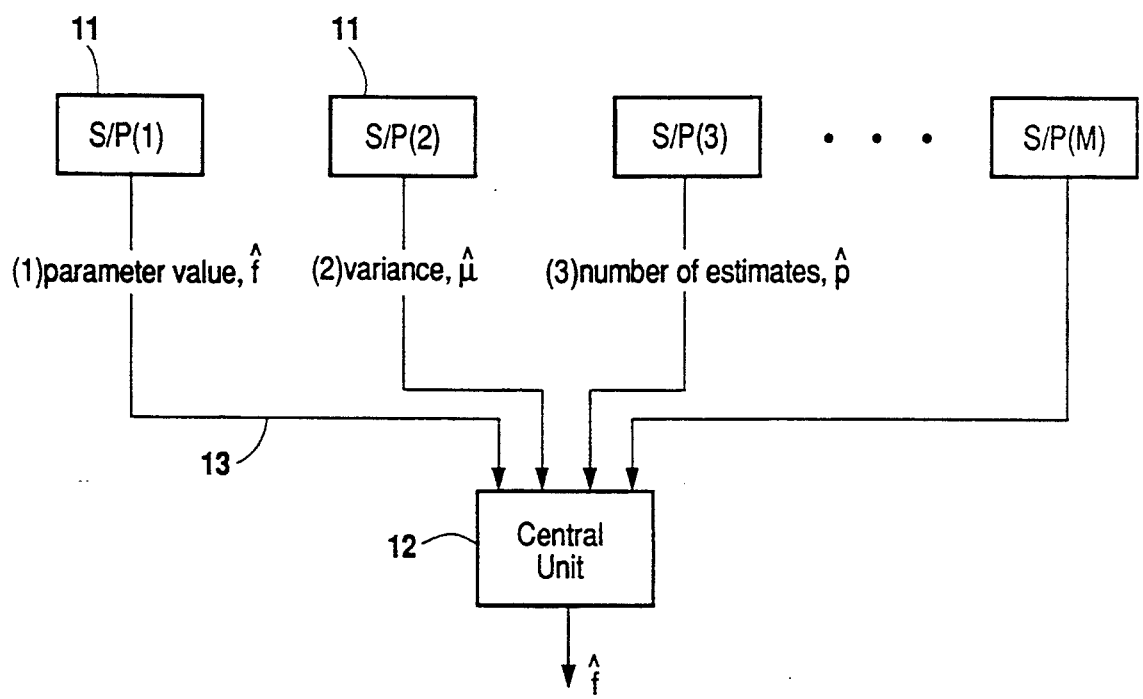
FIG. 1 is a block diagram of a distributed multi-sensor processing system for estimating parameters associated with random processes.

FIG. 1 is a block diagram of a basic distributed-sensor estimation system, having a number, M, of sensor/processor sites (S/P's) 11, in communication with a central unit 12. With respect to hardware, the components illustrated in FIG. 1 are similar to those of conventional distributed multi-sensor systems. However, as explained below, each S/P 11 calculates an estimate pair, upon which central unit 12 operates, using fuzzy set theory, to obtain a final estimate value.

At each S/P 11, a sensor 11a observes and quantifies a physical process. Each sensor 11a observes the physical process, with the use of multiple S/P's 11 being a feature of estimation systems that assure redundancy and accuracy.

The significant characteristic of sensors 11a is that they detect values useful for estimating at least one measurand, referred to herein as a parameter. Thus, sensors 11a could be any type of sensor, such as a transducer that generates an electrical signal representing an amplitude or angle of arrival.

For purposes of example in this description, sensors 11a are frequency sensors. Each sensor 11a may detect multiple frequencies, and the true number of source frequencies is assumed to be unknown. The source signal is considered to be the sum of sinusoidal signals and a white noise process. Thus, the observed signal at the i-th sensor 11a at time, t, may be expressed as:

$$y_i(t) = \sum_{k=1}^{p} [a_{i,k} \cos(2\pi f_{i,k}) + b_{i,k} \sin(2\pi f_{i,k})] + n_i(t) \quad (1)$$

where p is the number of sinusoids. The total number of observations is N, where t=1 . . . N. The unknown parameters, $a_{j,k}$ and $b_{i,k}$, are the coefficients of the sinusoidal signal, and the unknown parameter, $f_{j,k}$, represents the signal's central frequencies.

The noise factor, n, is assumed to be uncorrelated, but is a contaminated Gaussian random process. For purposes of this description, the following noise model is used:

$$n_i(t) = e_1(t) \text{ with probability } 1 - \epsilon \quad (2)$$
$$e_2(t) \text{ with probability } \epsilon$$

where $P[e_1(t)]$=Gaussian $(o,\rho)$, $P[e_2(t)]$=Gaussian $(o,\eta\rho)$, $\epsilon<<1$, and $\eta>>1$.

Each sensor 11a is associated with a processor 11b, which is programmed to generate at least two items of data for every observation: a parameter estimate and an estimate of the variance of the parameter estimate. In the example of this description, the estimated parameter is frequency, represented by $\hat{f}$. The variance is represented as $\hat{\mu}$. Each estimate, $\hat{f}$, and its variance, $\hat{\mu}$, are referred to herein as an estimate pair. Also, where more than one frequency is being observed and estimated, each S/P 11 provides an estimate of the number of frequencies, $\hat{p}$.

In the preferred embodiment, the frequency estimate, $\hat{f}$ at each sensor 11a, is obtained using a robust estimation method. This method is preferred because it is insensitive to changes in the underlying distribution.

The processor 11b at each S/P 11 may be a general processor, such as are commercially available, programmed to calculate $\hat{f}$, $\hat{\mu}$, and $\hat{p}$. Alternatively, processors 11b may be dedicated processors. The programming may be in the form of loadable software or may be permanently stored in a memory, such as a read only memory.

Each S/P 11 communicates its estimates to central unit 12 via a communications link 13. This link is provided by means of well known data communications techniques, and need only be a one way link. An example of such communication is a simplex connection.

Central unit 12 combines the estimates gathered from each S/P 11, in the manner described in the following sections of this patent application. Central unit 12 is often referred to as a "fusion unit" in other distributed estimation systems. Like sensor processors 11b, central unit may be a general processor or may be a dedicated processor, and may execute its programming from permanent or temporary memory.

Multiple Component Estimation

As stated above, estimation systems can be configured to measure a vast diversity of parameters. A common application is spectral estimation, where the parameter is one or more frequencies of a source signal. However, the invention is not limited to spectral applications. For example, another common application might be a system for measuring multiple angles of arrival, such as might be present in a sonar signal.

For purposes of this description, multiple frequency signals and multiple angle signals are referred to collectively as "multiple component" signals. Although this description is in terms of frequency measurements, the same concepts may be used for any other type of measurement system.

When multiple frequency signals are being observed, central unit 12 may receive different numbers of estimate pairs from different S/P's 11 at a single observation time. As explained above, each S/P 11 also provides an estimate of the number of frequencies, $\hat{p}_k$.

Because the true number of source frequencies is not known, central unit 12 performs a ranking or refitting method to combine the estimates. In general, the ranking method distinguishes among estimates on the basis of reliability, by ranking them according to their variances, so that a determination of which estimates to ignore can be made. Various ranking methods and refitting methods are known in the art of statistics.

In the preferred embodiment, a two stage ranking method is used. The first stage combines frequency estimates from S/P's 11 that obey $\hat{p}_k, \geq \hat{p}$, where $\hat{p}$ is an estimate calculated by central unit 12. For example, if there are eight S/P's 11, of which five deliver two estimates, two deliver three estimates, and one delivers one estimate, a reasonable value for $\hat{p}$ is 2. The second stage combines frequency estimates, $\hat{f}$, from all S/P's 11.

Thus, the first stage has the following steps:
1) Rank estimates in ascending order of their variance values.
2) Eliminate $\hat{p}_k - \hat{p}$ estimates whose rank is greater than p.
3) Rank the estimates again, but in ascending order of estimate values rather than variance values.
4) Group the estimates from various S/P's 11 such that the members of each group have the same rank.
5) Combine estimates for each group using a single component estimate combination method.

The result of stage one is a set of temporary combined estimates, $\hat{t}_k$ where k=1 . . . $\hat{p}$.

The second stage of the ranking method combines the frequency estimates from all S/P's 11. It has the following steps:
1) Represent S/P's 11 that obey $\hat{p}_k < \hat{p}$ with a set of indices, $\Gamma = \{k | p_k < p \text{ where } k = 1 \dots p\}$.
2) Compute distances between $\hat{f}_{ij}$ where i=1 . . . p, and $\hat{t}_k$ where k=1 . . . $\hat{p}$, for each j $\epsilon\Gamma$. The rank of $\hat{f}_{ij}$ is determined by the minimum distance between two estimates. In other words, if a difference is the smallest of all i's, the rank of that $\hat{f}_{ij}$ is n.
3) Group the estimates from various S/P's 11 such that the members of each group have the same rank.
4) Combine estimates from each group, including the estimates obtained in the first stage, using a single component estimate combination method.

As indicated above, both stages of the ranking method include a single component estimate combination step. Thus, in the example of this description, where the parameter being measured is frequency, the multiple frequency problem is solved by obtaining a set of single frequency estimates. The calculation of each single frequency estimate is described in the following section.

Single Component Estimation

Because the frequency estimate, f, from a S/P 11 is a function of the observations, a frequency estimate may be expressed as:

$$\hat{f}_{ij} = f_i^o + \hat{\epsilon}_{ij} \tag{3}$$

where $f_i^o$ is the true value of the i-th component frequency and $\hat{\epsilon}_{ij}$ is a perturbation term whose distribution is asymptotically Gaussian. The variance of $\hat{\epsilon}_{ij}$, denoted by $\hat{\mu}_{ij}$, is asymptotically the same as a diagonal component of a covariance matrix. However, due to physical conditions of sensors 11a, the distributions of a frequency estimate indicating the same component are not identical; in other words, $\Pr(\epsilon_{ij}) \ne \Pr(\epsilon_{i,k})$ if $j \ne k$. Thus, the problem of combining frequency estimates may be treated as an estimation problem. As stated in the background section, conventional methods of frequency estimate combining are linear, and include averaging, weighted least squares, and robust estimates methods.

A basic concept of the invention is the use of fuzzy set theory for combining estimates. The method "fuzzifies" the problem by constructing a fuzzy membership function for each frequency estimate. These membership functions are then combined, so as to minimize the area under the curve of the combined function. The problem is "defuzzified" by searching the argument of the maximum point of the combined membership function to obtain the combined frequency estimate.

For the case of an estimate of a single frequency, the fuzzy set estimation can be expressed as:

$$\hat{f} = \text{argument}\left\{\max\left(\sum_{k=1}^{M} a_k h_k(f)\right)\right\} \tag{4}$$

where $h_k(f)$ is a membership function of the k-th sensor.

Figure 2:
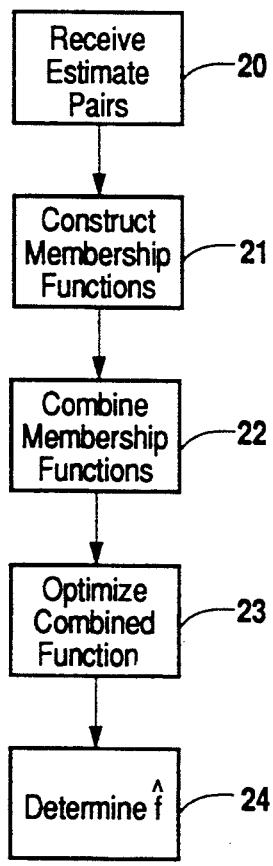
FIG. 2 illustrates the single component estimate combination process performed by the central unit of FIG. 1.

FIG. 2 illustrates the method of combining estimates, using fuzzy set theory. The following paragraphs explain these steps, as well as their theoretical justification.

Step 20 is receiving an estimate pair, $\hat{f}$ and $\hat{\mu}$, from each S/P 11.

Step 21 is constructing a membership function for each S/P 11. Construction of membership functions is based on the assumption that if the variance value of $\hat{f}_{ij}$ is smaller than that of $\hat{f}_{i,k}$ when $j \ne k$, then the frequency estimate $\hat{f}_{ij}$ is more reliable than $\hat{f}_{i,k}$. Similarly, it is assumed that if the area of a membership function of an estimate is smaller than that of another estimate, then the former estimate is more reliable than the latter.

By following the above assumptions, membership functions are constructed as a function of $\hat{f}$ and $\hat{\mu}$. Three possible membership functions are a triangular function, a bell-shaped function, and a trimmed bell-shaped function.

The triangular function is expressed as:

$$h_k(f) = \hat{f}_k + \sqrt{\hat{\mu}_k} \tag{5}$$

The bell-shaped function is expressed as:

$$h_k(f) = \exp\{-(f - \hat{f}_k)^2/\hat{\mu}_k\} \tag{6}$$

The trimmed bell-shaped function is expressed as:

$$h_k(f) = \begin{cases} (f - \hat{f}_k + \hat{\mu}_k)/\hat{\mu}_k & \text{if } \hat{f}_k - \hat{\mu}_k \le f \le \hat{f}_k \\ (\hat{f}_k + \hat{\mu}_k - f)/\hat{\mu}_k & \text{if } \hat{f}_k \le f \le \hat{f}_k + \hat{\mu}_k \\ 0 & \text{otherwise.} \end{cases} \tag{7}$$

Step 22 is combining the membership functions that were constructed in Step 21. Membership functions are combined by minimizing the area of the combined function. The minimum area, represented as:

$$h(f) = \sum_{k=1}^{M} a_k^m h_k(f) \tag{8}$$

is obtained with the following operation:

$$\int h(f) \, df = \sum_{k=1}^{M} a_k^m h_k(f) \, df \tag{9}$$

subject to $$\sum_{k=1}^{M} a_k = 1$$

and $a_k \ge 0.0$ where $\{a_k\}$ is a set of unknown weighting parameters. The weighting exponent, m, is a constant greater than 1.0, which controls the fuzziness of the combined result. Then, determining unknown values for $a_k$ can be treated as an optimization problem.

If, with the above constraints, $$E = \int \sum_{k=1}^{M} a_k^m h_k(f) df \tag{10}$$

the object function becomes:

$$L(a_k) = \int \sum_{k=1}^{M} [a_k^m h_k(f) df] - \lambda \left( \sum_{k=1}^{M} a_k - 1 \right). \tag{11}$$

Then, $$\frac{\partial L(a_k)}{\partial a_j} = 0 \tag{12}$$

$$m a_j^{m-1} \int h_j(f) df - \lambda = 0 \tag{13}$$

$$a_j = \left(\frac{\lambda}{m}\right)^{1/(m-1)} \left(\int h_j(f) df\right)^{-1/(m-1)}. \tag{14}$$

Since $\sum_{k=1}^{M} a_k = 1$, $$\sum_{j=1}^{M} a_j = \sum_{j=1}^{M} \left(\frac{\lambda}{m}\right)^{1/(m-1)} \left(\int h_j(f) df\right)^{-1/(m-1)} = 1 \tag{15}$$

$$\left(\frac{\lambda}{m}\right)^{1/(m-1)} = 1 / \left(\sum_j \left(\int h_j(f) df\right)^{-1/(m-1)}\right) \tag{16}$$

$$a_j = \left(\int h_j(f) df\right)^{1/(m-1)} / \left(\sum_j \left(\int h_j(f) df\right)\right)^{-1/(m-1)}. \tag{17}$$

A feature of the invention is that $\hat{f}$ is not a function of $\alpha$, as in the conventional methods. Thus, the following partial derivative may be calculated:

$$\frac{\partial h(f)}{\partial f} = \Sigma \, \alpha_k{}^m \frac{\partial}{\partial f} h_k(f) \tag{18}$$

which permits the optimization to be solved with the iterative operation described below.

Step 23 is optimizing the combined function to obtain the combined estimate. The combined estimate problem is represented by the following expression:

$$\hat{f}_{i,fuzzy} = Arg \left\{ \max_f \Sigma_j \left[ \frac{(\int h_j(f) df)^{-1/(m-1)}}{\left(\Sigma_j (\int h_j(f) df)\right)^{-1/(m-1)}} \right] h_j(f) \right\} \tag{19}$$

The combined function $\Sigma \, [.] \, h(f)$ is a convex function around the critical point.

To solve the combined estimate, an iteration method is used, which is essentially a gradient method. The frequency estimate is initialized as:

$$f^{(0)} = \sum_{k=1}^{M} w_k f_k \tag{20}$$

where values for $w_k = \alpha_k{}^m$ are obtained from equation (17) above.

Step 2 is computing j iterations, where at each j-th iteration, the frequency estimate is computed as:

$$f^{(j)} = f^{(j-1)} + \zeta \Delta h(f) \tag{21}$$
$$= f^{(j-1)} + \zeta \Sigma \alpha_k{}^m \frac{\partial}{\partial f} h_k(f) \tag{22}$$

where $\zeta$ is a positive constant that controls the speed of convergence.

Step 3 is determining when a stopping condition is reached as follows:

$$|f^{(j)} - f^{(j-1)}| < \gamma$$

where $\gamma$ represents a predetermined accuracy value. The iterations of Step 2 are continued until the convergence of Step 3 is reached.

Figure 3:
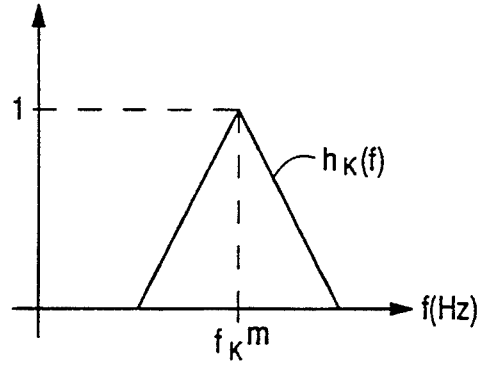
FIG. 3 illustrates the relationship of the combined function and the combined estimate, as calculated from the process of FIG. 2, to the true parameter value.

FIG. 3 provides a graphic illustration of the estimate combining method. For purposes of example, the combined membership function, $h_k(f)$, is a triangular shaped function. Its maximum point is $\hat{f}_k{}^m$, thus the final estimate is $\hat{f} = \hat{f}_k{}^m$. The degree of closeness of the true frequency, f, to the estimated frequency, f is the value of $h_k(f)$. Thus, as $h_k(f)$ approaches 1, f approaches $\hat{f}$.

Single Sensor Multi-Point Estimation

Another application of the invention is combining estimates from a single S/P 11. Here, although there is only one S/P 11, more than one estimate is obtained over time.

The same techniques as described above may be used to combine the estimates. Each estimate is associated with a membership function, and the functions are combined to obtain the combined estimate.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A distributed sensor system for estimating a value of a physical parameter, comprising:

a plurality of sensors for detecting a physical process and quantifying said physical process as a parameter;

a plurality of sensor processors, each of said sensor processors being associated with one of said sensors, respectively, wherein each of said sensor processors is programmed to calculate an estimate and a variance for each observation of said sensors;

a central unit in communication with said sensor processors, wherein said central unit is programmed to convert said estimate from each of said sensor processors in accordance with fuzzy logic and a membership function from a plurality of membership functions and combining said plurality of membership functions and determining a minimum area under a curve corresponding to said combined membership functions, to determine a final estimate; and a communications link from each of said sensor processors to said central unit.

2. The system of claim 1, wherein said sensors are frequency sensors.

3. The system of claim 1, wherein said sensors observe angles of arrival.

4. The system of claim 1, wherein said sensors detect multiple components of said physical process, and wherein said sensor processors calculate an additional estimate for each of said multiple components and a further estimate for the number of components.

5. The system of claim 4, wherein said central unit is further programmed to distinguish estimates on the basis of reliability.

6. The system of claim 1, wherein said central unit is further programmed to derive each of said membership functions from said estimate and said variance of each observation.

7. The system of claim 1, wherein said central unit is further programmed to calculate said final estimate by optimizing said combined membership functions.

8. A single-sensor system for estimating a value of a physical parameter, comprising:

a sensor for detecting observation values at a predetermined number of observation times;

a first processor associated with said sensor, wherein said first processor calculates an estimate and a variance for each observation corresponding to said observation values; and a second processor associated with said sensor, wherein said second processor is programmed to convert each estimate corresponding to said sensor in accordance with fuzzy logic and a membership function from a plurality of membership functions and to combine said plurality of membership functions to determine a minimum area under a curve corresponding to said combined membership functions to determine a final estimate.

9. The system of claim 8, wherein said second processor is further programmed to derive each of said membership functions from said estimate and said variance of each observation.

10. The system of claim 8, wherein said second processor is further programmed to calculate said final estimate by optimizing said combined functions.

11. A distributed sensor system for estimating a value of a physical parameter, comprising:
- a plurality of sensors for detecting a physical process and quantifying said physical process as a parameter;
- a plurality of sensor processors, each of said sensor processors being associated with one of said sensors, respectively, wherein each of said sensor processors is programmed to parallel process and to calculate an estimate and a variance for each observation of said sensors;
- a central unit in communication with said sensor processors, wherein said central unit is programmed to convert each estimate from each of said sensor processors by using fuzzy logic and a membership function from a plurality of membership functions and to combine said membership functions to determine a minimum area under a curve corresponding to said combined membership function a final estimate; and
- a communications link from each of said sensor processors to said central unit.

* * * * *